(12) United States Patent
Brunelli et al.

(10) Patent No.: US 6,305,606 B1
(45) Date of Patent: Oct. 23, 2001

(54) PROCESS FOR SCANNING A BAR CODE

(75) Inventors: Elena Brunelli, Bentivoglio; Marco Bottazzi, Ferrara; Rinaldo Zocca, Bologna, all of (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/126,606

(22) Filed: Jul. 31, 1998

(30) Foreign Application Priority Data

Aug. 1, 1997 (EP) .................................................. 97830408

(51) Int. Cl.[7] ..................................................... G06K 7/10
(52) U.S. Cl. ................... 235/462.16; 235/462.16
(58) Field of Search ..................... 235/462.02, 462.12, 235/462.16, 462.17, 462.18, 462.19, 462.25, 462.27, 494

(56) References Cited

U.S. PATENT DOCUMENTS

| | | |
|---|---|---|
| 4,414,468 | 11/1983 | Laurer et al. . |
| 5,444,231 | 8/1995 | Shelhammer et al. . |
| 5,451,761 | 9/1995 | Kawai et al. . |
| 5,514,858 | 5/1996 | Ackley . |

FOREIGN PATENT DOCUMENTS

WO9630859   10/1996   (WO) .

*Primary Examiner*—Karl D. Frech
*Assistant Examiner*—Daniel St.Cyr
(74) *Attorney, Agent, or Firm*—Sughrue, Mion, Zinn, Macpeak & Seas, PLLC (57) ABSTRACT

The invention relates to a process for scanning a bar code which includes acquiring a first bar code scanning along a scanning line, identifying the family of the bar code, determining the width of at least one of the synchronism characters, calculating the estimated width of each character of the code being examined, based an the width of the synchronism character considered, determining a character following one of the synchronism characters by counting a number of m elements equal to the number of elements that make up each character in the family identified, determining the width of the following characters, checking whether the width of such following character differs from the estimated width of a lower quantity with respect to a prefixed tolerance. If the check gives a positive result, identifying the character and reiterating the steps until the other synchronism character has been reached. If the check gives a negative result, label the following character as an "undecodable character".

25 Claims, 5 Drawing Sheets

PROCESS FOR SCANNING A BAR CODE

BACKGROUND OF THE INVENTION

The present invention relates to a process for scanning bar codes, and more particularly to a process for decoding a "deteriorated" bar code.

As is known, bar codes are widely used in the automatic identification of products.

A bar code is made up by a set of clear and dark zones, referred to in the following as space and/or bar type elements. Such elements have a rectangular shape and each of them may have a different width value.

A set of elements represents a code character univocally and a set of characters represents a symbol of a particular code univocally.

In fact, each code is defined by a set of rules that are the coding and decoding protocol for such particular type of code. Hence, a given set of characters that satisfies such protocol represents the decoded symbol of the code being examined.

Different processes for scanning and decoding bar code symbols are known in the art. A typical process may be summarised as follows: a bar code reading device illuminates the code to be identified along a reading line; the diffused light is picked up by a photosensor which generates, in its turn, an analog signal proportional to the intensity of the diffused light.

Said analog signal is processed by a block called digitaliser, whose task is to extract from the analog signal the numeric characteristics that represent it completely, so as to define a scanning of the code being examined.

Such scanning is then elaborated by a bar code decoding programme, which, based on a protocol for decoding the particular type of code, classifies the individual characters one at a time, starting from a synchronism character of start until a synchronism character of stop is reached, so as to provide as a conclusion the set of characters that define the decoded symbol of the bar code being examined.

One of the basic limits of the decoding process described hereinabove lies in that, if the label carrying the code to be decoded shows some alterations (such as, for instance, spots, abrasions or smears) on some points wherethrough the scanning is performed, the decoding process stops as it cannot decode the altered characters of the code, and gives an error indication. In this case, all the information obtained from the processing of said scanning are rejected and a new scanning process, carried out on a different zone of the label, is tried, until a complete string of decoded characters is obtained.

However, such process cannot ensure the decoding of deteriorated or locally altered labels, due to the impossibility of finding an entirely clean scanning.

Local alterations of labels cause reading errors that may be generally classified into three categories:

split-like error: this happens when an individual element (bar or space) is digitalised as if it were at least three smaller elements (a typical error caused by a small width abrasion or spot on the label);

merge-type error: this happens when at least an individual element is ignored during the digitalisation, with ensuing merging of the same with the two adjoining elements into one only element (a typical error caused by a large width abrasion or spot on the label);

misread-type error: this happens when, along a given scanning line, an individual element is digitalised in a distorted manner, altering the classification to a significant extent (a typical error caused by a print smear).

The aforementioned errors may be found also at the same time on a same scanning line of the code being examined, stopping or in any case invalidating the decoding process of the code along such particular scanning, so that the analysis of a subsequent code scanning becomes necessary. In order to produce a feasible and/or quicker decoding scanning, several processes have been proposed in the last years, wherein the code decoding is performed by utilising information taken from several scannings.

For instance, the U.S. Pat. No. 5,262,626 discloses a method for decoding a bar code symbol wherein the information obtained from two different scannings are compared to one another in order to process a complete decoding string. More particularly, the elements of the undecoded characters of a first scanning are iteratively replaced by the elements of the decoded characters of a second scanning having the same position within the code being examined, obtaining in this way an increasingly complete decoding string. If two compared scannings should have, in the same position, two different decoded characters, the known art suggests that the scanning containing the highest number of decoded characters be kept. Besides, if both scannings should have the same decoded characters, the known art suggests that the most recent scanning be kept and a new scanning acquired.

Even though it satisfies the need of accelerating the decoding process, the above described process has several drawbacks.

A first drawback is related to the high computation effort associated to the fact of working with the individual elements of the characters.

A second drawback is related to the low reliability of such decoding process. Actually, the decoded characters are submitted neither to controls nor to exactness checks: this may lead to the processing of a complete but not correctly validable decoding string or, still worse, to a string that, while being validable, does not correspond to the original string.

More particularly, if both of the compared scannings have two different decoded characters in the same position, the decision of considering as "good" the character belonging to the scanning containing the highest number of decoded characters does not provide any warranty as concerns the real validity and/or exactness of said character. In this case it may happen that a character be identified that actually does not exist in the label being examined, attributing therefore to said label a wrong code symbol. Such drawback is partly overcome by U.S. Pat. No. 5,438,188, which teaches a decoding process wherein the classification of the individual characters of a scanning is performed by comparing the elements of the code being examined with all the possible characters defined in the protocol of such particular type of code; an error coefficient is calculated for each comparison and the character with the lowest error coefficient is classified. The decoding of the bar code symbol is carried out thereafter by comparing the information iteratively obtained from two different following scannings, and considering as "good" the decoded character that has, in that particular position, the lowest associated error coefficient.

Such decoding technique, while being an improvement as concerns the reliability of the decoded characters, has still the drawback of requiring high calculation resources for the processing of the individual scannings. Such drawback is due to the necessity of carrying out, for each element of the code, a comparison with all the possible characters of the decoding protocol. Therefore, this process requires a particularly exacting computation effort, which often translates into long decoding times.

In fact, it should be kept in mind that the calculation resources necessary for the decoding and the decoding time are parameters of basic importance for the selection of the decoding programme to be utilised and limit often the application field of said programme.

For instance, the calculation resource parameter is particularly important in case of utilisation of code scanning devices of the manual type, which, for reasons of cost, have limited storing availability and calculation power.

Instead, the time factor is particularly important especially in the cases where—as for instance in shop counters or product storehouses—the identification of the code must take place as quickly as possible, not to create a bottleneck to the flow of goods to be identified.

A further drawback of all the aforementioned decoding processes concerns the impossibility, for the decoding programmes, of completing the reading of the scanning each time an undecodable characters is found in the same.

In such situation, the decoding programmes cannot read the code characters following the zone where an error has been found. In fact, as such programmes cannot distinguish the code zone invalidated by an error from the code zone related to the following character, they cannot determine the point where they should start anew the decoding of the code characters. Therefore, the decoding proceeds with the acquisition of a new scanning and the comparison of the two acquired scannings, to process a complete decoding string of the symbol of the code being examined.

It can be easily understood that, in case of very deteriorated labels, the utilisation of the aforementioned processes involves the need of providing to the acquisition of a high number of scannings before being able to process a complete decoding string. This involves a rather long decoding time and a very high use of calculation resources, which factors, as has been said, are both of a basic importance.

SUMMARY OF THE INVENTION

The technical problem which lies at the basis of the present invention is that of contriving a process allowing to carry out with a high degree of reliability a bar code scanning, without requiring high calculation and storing resources.

Therefore, it is an aspect of this invention to provide a process for bar code scanning, said code comprising two synchronism characters, one of which is a character of start and the other one a character of stop, and a plurality of useful characters in-between the character of start and the character of stop, each character comprising in its turn a plurality of bar-and-space elements, said process comprising the following steps:

a) acquisition of a first bar code scanning along a scanning line, b) identification of the belonging family of the bar code, and, being characterised in that it further comprises the following steps:

c) determination of the width of at least one of the synchronism characters, d) calculation of an estimated width of each character of the code being examined, based on the width of the synchronism character considered, e) identification, by way of first approximation, of a character following one of the synchronism characters by counting a number of m elements equal to the number of elements that make up each character in the belonging family identified, f) determination of the potential width of said following character, g) checking whether the potential width of such following character differs from the estimated width of a lower quantity with respect to a prefixed tolerance, and:

g1) if such check gives a positive result, identification of said following character as a "decodable character", and repeating, for each character following the decodable character, of the steps e) through g), until the other synchronism character has been reached, g2) if such check gives a negative result, labelling of such following character as an "undecodable character". Therefore, before proceeding with the decoding of an individual character, a control of a geometric type is carried out, based on the structural characteristics of the code whose decoding is being tried. In this way one ensures the reliability of the decodable character and at the same time the scanning zones that might contain errors are identified in advance. The decoding of these zones is avoided.

Besides, as it is only a matter of a simple geometric control between two characters at a time, calculation and storing resources are required that are not particularly exacting; this brings about quick response times and a remarkable cost saving.

Advantageously, if the check of step g) gives a positive result, the decoding of the decodable character is tried before repeating steps e) through g) for the following characters, and:

if said decoding gives a positive result:

storing of the decoded character in a decoding string intended for containing a first set of hypothetical values of the code characters, updating of the estimated width of the character of the code being examined depending on the decoded character, if said decoding gives a negative result:

identification of said character as an "undecodable character", and repeating of steps e) through g) for each following character.

Still more advantageously, the updating of the estimated width of the code character can take place either by assuming as estimated width the width of the decoded character or by calculating an arithmetical mean between the width of the decoded character and the previously estimated width. Such continuous updating ensures each time increasingly high reliability levels.

According to a particularly advantageous embodiment of the process according to the invention, if the try at decoding the decodable character gives a positive result, an error coefficient associated to the decoded character is calculated.

Preferably, the error coefficient is calculated according to the following formula:

$$err_k = \min\left\{\frac{2*d}{m}, 1\right\}$$

with $d=\max|e_i-e_i^*|$, wherein i varies throughout the whole of elements of the character, and wherein m is the module estimate performed throughout the scanning, wherein the module is the width of the smallest element of the scanning, $e_i$ is the value of the width of the $i^{th}$ element of the character, $e_i^*$ is the value of the width of the ideal $i^{th}$ corresponding element in the classified character, d is the greatest of the distances of each element from its own ideal value.

Therefore, the reliability of the decoded character is effectively evaluated through the calculation of a simple numeric parameter associated to said character.

Advantageously, if the check gives a negative result, the following steps are carried out:

h) identification, by way of second approximation, of the character following one of the synchronism characters, counting a number of elements equal to m±2, i) determination of a new potential width of such following character as identified by way of second approximation, l) checking if said new potential width differs from the estimated width of a lower quantity with respect to the prefixed tolerance, and:

l1) if such check gives a positive result, identification of such following character as found by way of second approximation as being an "undecodable character", and reiteration, for each character following the identified character, of steps e) through g) until the other synchronism character has been reached, l2) if such check gives a negative result, reiteration, for a p number of times, of the operations h) through l), adding to or removing each time two further elements from the previously counted number of elements. Still more advantageously, if the $p^{th}$ check 12) of the new width gives a negative result, the following steps are carried out:

m) counting of a number of m elements equal to twice the number of m elements that make up each character in the belonging family identified, n) determination of the width of said 2m counted elements, o) checking whether such width differs from twice the estimated width of a lower quantity with respect to the prefixed tolerance, and:

o1) if such check gives a positive result, labelling of the code zone corresponding to the 2m elements counted as "2 undecodable characters" and reiteration of steps e) through g) for each character following the 2 undecodable characters, until the other synchronism character is reached.

On the contrary, if such check gives a negative result, the following steps are carried out:

o2) reiteration of steps m) through o), counting a number of elements equal to 3m, and:

o2i) if the check between the 3m elements and the triple of the estimated width gives a positive result, labelling of the coding zone corresponding to the 3m elements counted as "3 undecodable characters", and reiteration of steps e) through g) for each character following the 3 undecodable characters, until the other synchronism character is reached, o2ii) if said check gives a negative result, labelling of the code zone following the last character that has been identified or labelled as an "undecodable zone" of the bar code and proceeding to acquiring the code scanning according to the same scanning line gone through in the opposite direction, reiterating steps e) through o2), so as to obtain a new string comprising a further first set of hypothetical values of the code characters.

In this way it is possible to identify exactly the type of errors present, for instance, in labels with deteriorated code bars, and at the same time to define the code zones affected by said errors, so as to avoid their decoding.

The above contrievances allow also to pass over such error zones, enabling the decoding try until the whole scanning has been completed.

As an alternative, if any whatever check between elements (m, 2m, 3m) and the corresponding estimated width gives a negative result, the code zone that follows the last character that has been identified or labelled is labelled as an "undecodable zone" of the bar code, and the code scanning according to the same scanning line gone through in the opposite direction is acquired, reiterating steps e) through o2), so as to obtain a new string comprising a further first set of hypothetical values of the code characters.

According to a further alternative embodiment, if any whatever check between elements (m, 2m, 3m) and the corresponding estimated width gives a negative result, the decoded data of the scanning being examined are acquired, the try at decoding according to the same scanning line is stopped, and the acquisition of a new scanning is started according to a different bar code scanning line.

Advantageously, the values of the first set of hypothetical values of the code characters are compared with the values having the same position of the further first set of hypothetical values of the code characters, in order to process a current string according to the following steps:

14a) if, in the considered position, a decoded character and an undecodable character are found, the value of the decoded character is stored in the current string, 14b) if, in the considered position, two equal decoded characters are found having a different coefficient of associate error, the value of the character having the lowest coefficient of associated error is stored in the current string, 14c) if, in the considered position, two different decoded characters are found, the value of the character having the lowest coefficient of associated error is stored in the current string, 14d) if, in the considered position, two undecodable characters are found, an unknown character is stored in the current string.

In this way a completely decoded string is obtained, from which the validation can be tried according to the syntax rules of the code being examined.

Advantageously, if an unknown character is stored in the curren t string, the following steps are carried out:

15a) acquisition of a new bar code scanning, according to a new scanning line, 15b) obtaining a new set of hypothetical values of the code characters according to steps e) through o2), 15c) comparison of such new set of hypothetical values with the previously processed current string, in order to update such string according to steps 14a) through 14d), 15d) reiteration of steps 15a) through 15c) until all the characters of the current string have been decoded, 15e) performation of a validation try of the decoded characters of the current string.

It is therefore obvious that by exploiting the whole information contents of error comprising scannings, the number of scannings necessary to decode the whole code reduces markedly.

In case of heavily deteriorated labels, the decoding of the bar code symbol can be obtained by carrying out two only scannings, with a marked saving of time, calculation resources and therefore costs.

Advantageously, the current string or the values of the first hypothetical set of code characters are stored in a buffer A and submitted to a set of heuristic check rules, in order to reject in advance poorly reliable characters. It is a second aspect of this invention to provide a process for the combination of a partly or entirely decoded first string, obtained according to any of the preceding claims, with at least a second string, to process a complete decoding string, said process comprising the following steps:

18a) providing of a partly or entirely decoded first string of data, comprising a plurality of decoded characters and an error coefficient associated to each decoded character, 18b) storing of said first string in a buffer A, 18c) updating with said first string of a buffer B, intended for containing consolidated data, 18d) storing of a second string in buffer A, 18e) updating of buffer B with said second string, 18f) if buffer B contains a complete string of entirely decoded characters, performing of a validation try of said complete string, 18g) if the validation try gives a positive result, rendering the decoded string available, 18h) if the validation try gives a negative result, acquisition of a third string and reiteration of steps 18d) through 18f).

Advantageously, the process of association of characters obtained from several scannings, in order to obtain a complete decoding string, takes place by using the error coefficient as a discriminating criterion. This criterion allows to limit character classification tries only to the decoded characters having a low error coefficient, i.e. to the "reliable characters" only. Such characters have a high probability of being validated correctly.

Further characteristics and advantages of a process according to this invention will appear more clearly from the following description of a preferred embodiment, wherein reference is made to the attached drawings.

DETAILED DESCRIPTION OF THE INVENTION

Figure 1:
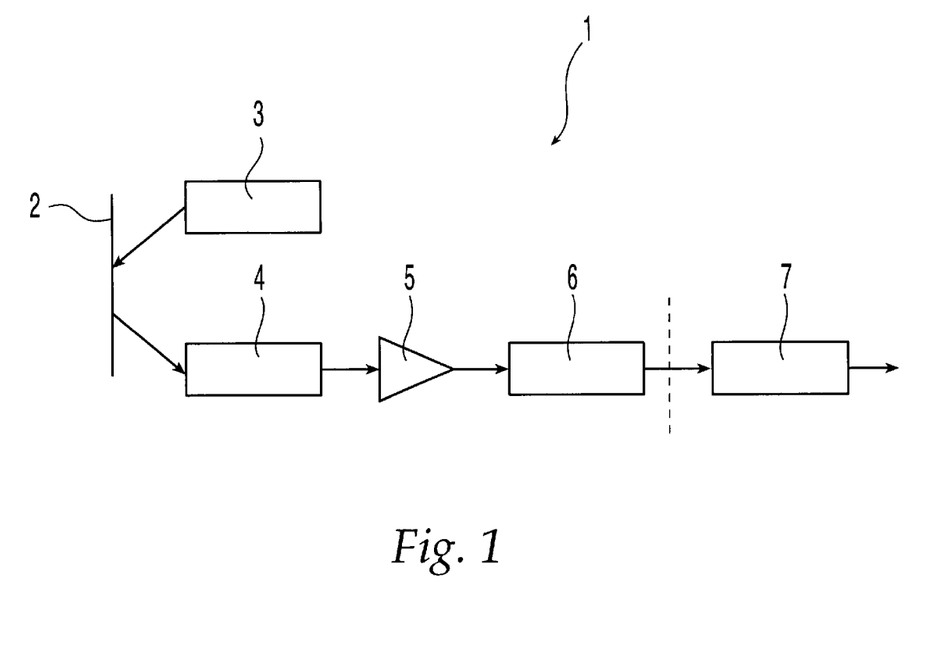
FIG. 1 shows a simplified block diagram of a reading device of a bar code symbol.

In said figures, 1 indicates a device for reading and decoding a bar code symbol, indicated by 2 in FIG. 1. The reading device 1 comprises a light source 3 (for instance a laser or a LED set) that illuminates the bar code symbol 2 along a reading line and a light detector 4 (for instance a photosensor), that picks up the light diffused by the bar code symbol 2 and that generates, in its turn, an analog signal reproducing the intensity change in the light diffused by the bar-and-space set of the illuminated symbol 2.

Having been suitably amplified by an amplifier 5, the analog signal generated is processed by a digitalising block 6, whose task is to extract from that analog signal numeric characteristics, called features, that represent the same completely, so as to define a scanning of the code being examined.

While the standard whole of extracted features is represented by the set of widths of the elements of the bar code symbol 2, the above described process is valid even if features different from the width of the elements are used and even if more features are used at once.

An example of different features is represented by the distance between following peaks and throughs of the analog signal: in this way the distances represent each the summation of the widths of two elements of the bar code symbol 2.

As a sensitive element for picking up the light diffused by symbol 2 there may be utilised, alternatively, a matrix-CCD, which allows to reproduce a two dimension image of the symbol being examined; the scanning can be performed on this image through the software, whereby the scanning produces a vector of features to be analysed.

Such scanning is then processed by a processor 7, provided with a suitable programme for decoding bar codes, classifying therefore an individual character at a time, starting from an initial synchronism character until a final synchronism character is reached.

Afterwards, the decoding programme checks the validation and formatting of the string of decoded characters, according to special self-checking rules that are typical of the particular decoding protocol utilised so as to provide, in conclusion, the set of characters that define the decoded symbol of the bar code being examined.

Figure 2:
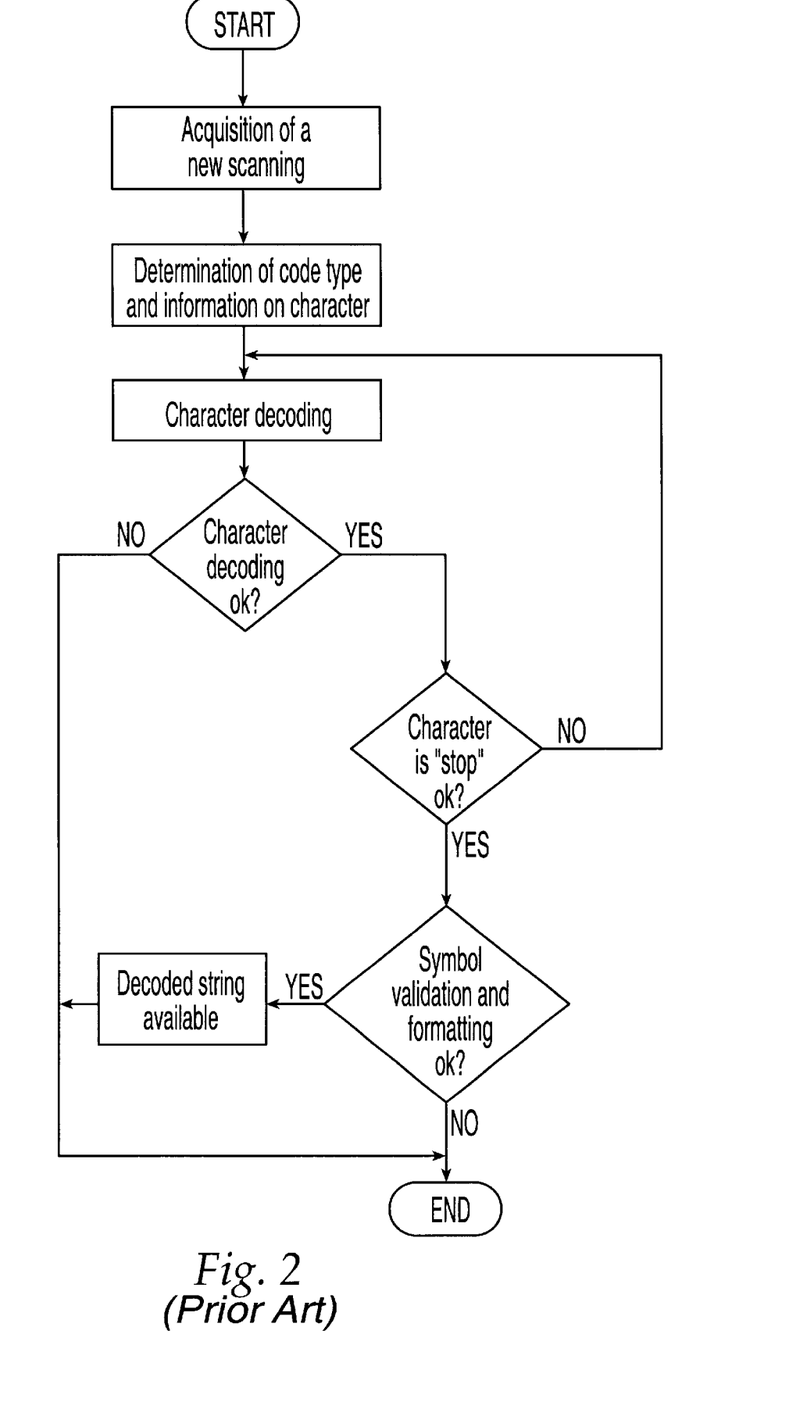
FIG. 2 shows a block diagram of a decoding process of a bar code symbol, read by the device of FIG. 1, according to a process of the known art.

Before describing the decoding and scanning process of the present invention, it seems suitable to describe a conventional decoding process, such as the one represented in FIG. 2.

The decoding process of such figure includes the following steps:

Acquisition of a first scanning, namely a features-containing buffer.

Performing of the necessary checks (on synchronism characters, number of elements acquired, etc.) to establish which code family symbol 2 belongs to, among the many existing families. Each code family is actually characterised by many properties including the number of elements that make up each character and the self-checking rules. Thereafter, the information on the number of elements per character is inferred from the determination of the type of code.

Classification of an individual character at a time, taking from the scanning as much elements as are needed to construct a character of the symbology being examined.

If the classification of the individual characters gives a positive result, the process goes on until a final synchronism character is reached, after which the formatting and validation checks of the string of the decoded symbol 2 are performed according to the self-checking rules of the code being examined, concluding in this way the decoding process by producing the decoded string.

If the classification of the individual character cannot be performed because of the deterioration of the elements of symbol 2, or if any check whatever has not a successful outcome, the decoding process ends with an indication of error, and makes itself ready for a subsequent scanning, rejecting all the information obtained from the preceding scanning.

The scanning and decoding process according to the present invention introduces some basic changes with respect to the above described conventional process (see the discontinuous line blocks of FIG. 3); such modifications will be now analysed in detail.

Figure 3A:
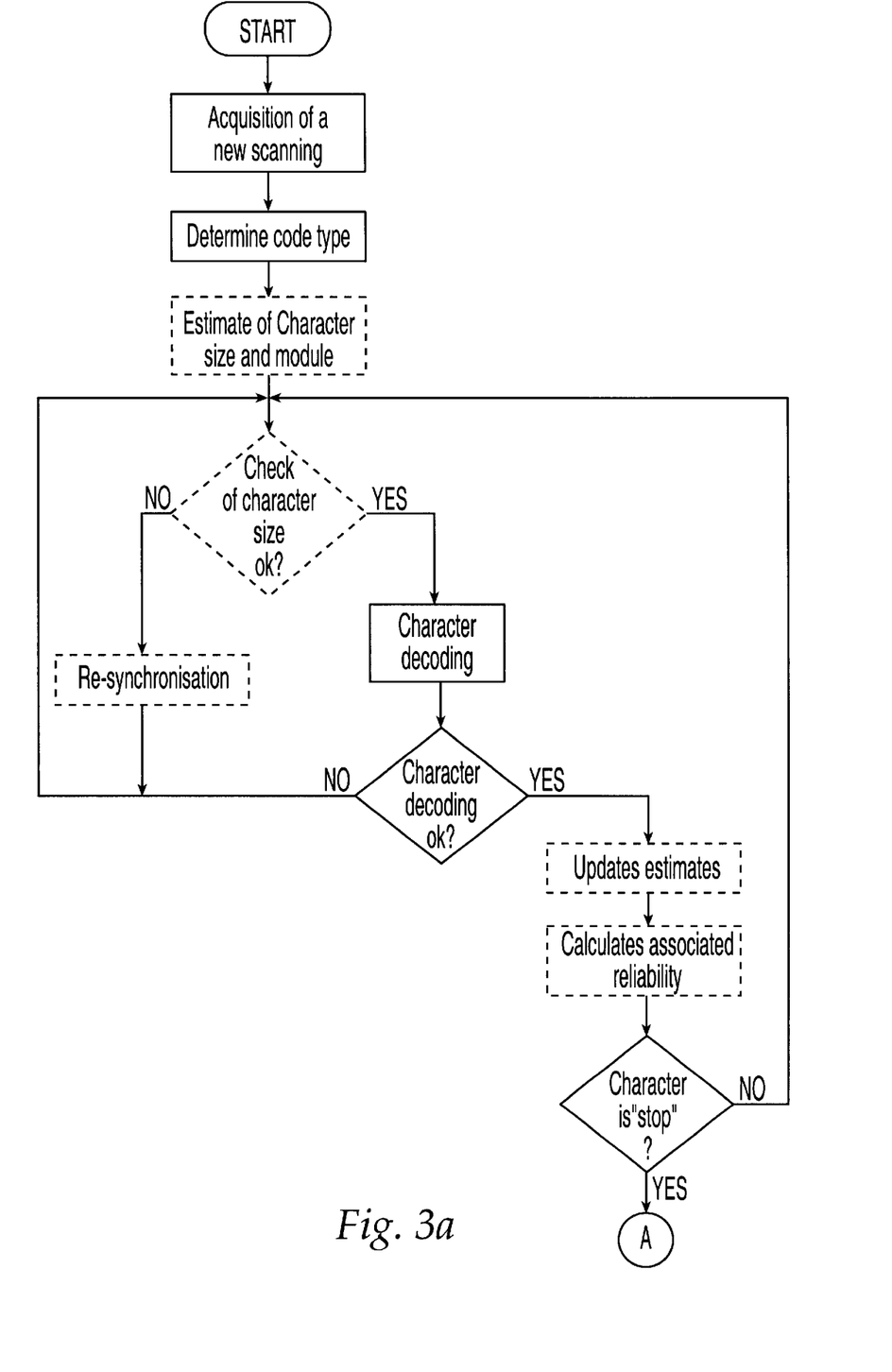
FIG. 3 shows a block diagram of a decoding process of a bar code symbol, read by the device of FIG. 1, according to the invention.
Figure 3B:
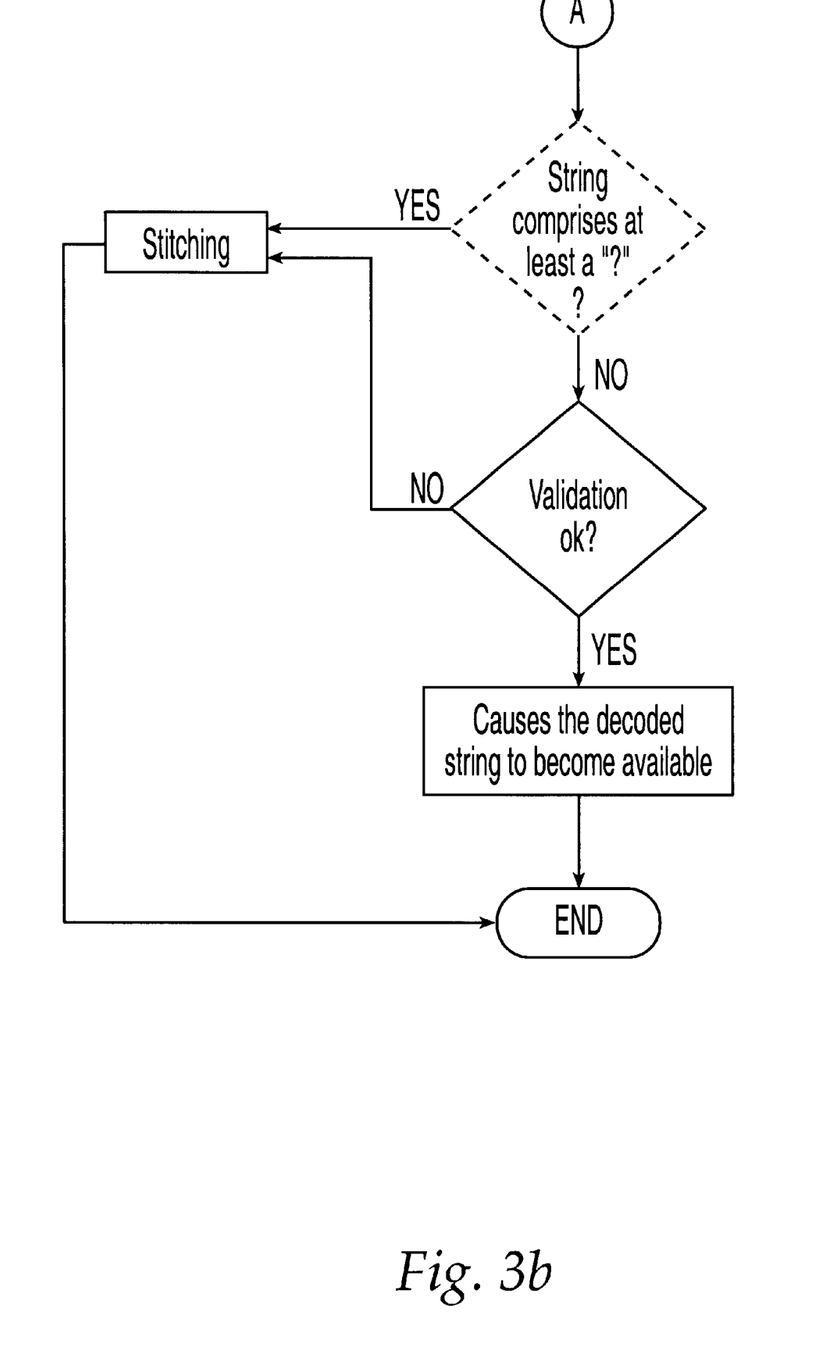

Having determined the type of code, one performs, according to the invention, an estimate of the size of a character (the size of each of the code characters is equal, or in any case correlated, to the size of the synchronism characters), and of its module, starting from one of the synchronism characters. The estimate of the module may also be performed by utilising the whole scanning.

In the present text, by size of a character there is intended to indicate the summation of the widths of all the elements that make up said character; and by module, the width of the smallest element.

Such estimate is utilised to perform a preliminary check of the character elements that are to be processed. In particular, said comparison lies in the summation of the widths of a number of elements equal to those that make up a character of the code being examined, in order to calculate a potential width of such character, and to compare the value obtained from such summation with the value obtained from the estimate performed previously, to check whether their difference falls or does not fall within a prefixed tolerance interval. In the present text, such tolerance must be understood in a relative sense with respect to the estimate value referred to. By referring said difference to the value of such estimate, one obtains a tolerance interval expressed in percentage.

If the check has a positive result, a try at classifying the character is made. Each time the classification of the character gives a positive result, the previously calculated reference estimates are updated according to the present data and an error coefficient to be associated to said character is calculated.

The updating of the reference estimates may take place either by assuming as an estimated width the width of the decoded character or by calculating an arithmetic mean between the width of the decoded character and the previously estimated width.

The error coefficient is directly proportional to the distance between the acquired character and the ideal character wherein it has been classified. The preferred expression for calculating the error coefficient associated to the $k^{th}$ character is the following one:

$$err_k = \min\left(\frac{2*d}{m}, 1\right)$$

with $d = \max|e_i - e_i^*|$, wherein i varies throughout the whole of elements of the character, and wherein m is the module estimate performed throughout the whole scanning, $e_i$ is the value of the width of the $i^{th}$ element of the character, $e_i^*$ is the value of the width of the $i^{th}$ ideal corresponding element in the classified character, d is the greatest of the distances of each element from its own ideal value.

Therefore, the error coefficient is standardised with respect to the module estimate and may take on values comprised between 1 (when the character element that differs most from its ideal width is distant from the same by a quantity greater than or equal to a half-module) and 0 (when such distance is null).

The classification process of the characters of the bar code symbol 2 continues therefore until the other synchronism character has been decoded, in the same way as the above described conventional process, so as to obtain a string comprising a first set of hypothetical values of the code characters.

Afterwards, if the whole character set has been decoded successfully, the validation and formatting of such string is carried on.

Otherwise, a stitching algorithm is utilised that tries to combine decoded characters obtained from several strings, which will be described in detail hereunder.

In such algorithm, if a completely decoded string can be obtained, the validation of the same is given a try, as described hereinabove. If such validation gives a negative result, the decoding programme stores the data obtained from the scanning and starts the analysis of a new scanning of the bar code symbol 2.

According to a particularly advantageous embodiment of the process of the present invention, before analysing a new scanning according to a different scanning line of the code being examined, a scanning is analysed that is read according to the same scanning line previously analysed, but in the opposite direction. Thereafter, such inverted scanning is either combined with the preceding scanning in order to obtain an individual scanning or both scannings are taken into consideration (together with the other ones) by the stitching algorithm.

Instead, if the comparison between the potential width of the character and the estimate gives a negative result, the character is undecodable. Hence, in the position of the string that contains the decoded characters an unknown character ("?") is stored, and thereafter the following elements of the acquisition buffer are processed according to a re-synchronisation mechanism which is described hereunder in detail.

When the width of the whole of the elements greatly deviates from the estimate, it is sure there is an error. The process of this invention can identify the type of such error by checking whether the width of the character being examined is smaller or greater than the estimated one by an excess quantity with respect to a prefixed tolerance. If it is smaller, this means that in such part of the scanning errors have taken place comprising at least one split-type error that has introduced elements having a width smaller than that of the original ones; if it is greater, this means that errors have taken place comprising at least one merge-type error, that has introduced elements having a width greater than that of the original ones.

Having recognised the type of error, the process goes on trying to pass over such error-containing zone, to position, in the scanning, at the beginning of a new decodable character, in the following way:

If the error detected is of the split-type, the two following elements (which obviously belong to the character being examined) that correspond to a bar-space or space-bar couple are acquired by the scanning and the relative width is added to the one of the character being examined.

If the error detected is of the merge-type, the width of the two last elements which obviously belong to the following character is subtracted from the width of the character being examined.

Now, a new check is performed on the width of the character obtained, and:

If this width differs from the estimate by a quantity smaller than the prefixed tolerance, the synchronisation at the beginning of a possible new character has taken place successfully. Therefore, an unknown character is introduced in the decoding string, and one passes to the classification of the following character.

If this width differs from the estimate by a quantity greater than the prefixed tolerance, one reiterates the operation of adding or subtracting two elements at a time until the summation of the widths of a certain number of elements almost approaches the estimate of the character. If, having reiterated this latter operation for a given number of times (for instance and preferably 2 times), the try at synchronising at the beginning of a decodable character still gives a negative result, or if, during the re-synchronisation operation one notices that the width of n elements is too much greater (smaller) than the estimate of the character, while the width of n−2 (n+2) elements is much smaller (greater) that the same estimate, this means that the alteration of the label has brought about an error on the end elements of a character and at the same time on the first ones of the following character, causing their boundary to be indistinguishable. Under these circumstances, one stores the data acquired and passes to the analysis of the same scanning but read in the opposite direction, obtaining a new string comprising a further first set of hypothetical values of the code characters. Such new string of partly decoded data is combined with the string obtained from the first scanning to obtain one only string that will be called a current string. Alternatively and preferably, the re-synchronisation goes on by taking as a reference the width of two characters and checking whether the summation of a number of elements equal to those that make up two characters is comparable, less the prefixed tolerance, with twice the estimate of a character. If the re-synchronisation is performed successfully, the process goes on as before, based on the estimate of one only character. Otherwise, one can store the acquired data. and pass then to the analysis of a new scanning or, preferably, one reiterates the re-synchronisation operation considering the width of three characters. Possibly, the process may go on with the width of four characters, etc. If also this try should fail, the whole acquisition is rejected and a new scanning is analysed. Preferably, as it has been already said, one stores the acquired data and passes then to the analysis of a new scanning, but read this time in the opposite direction, obtaining the new string of partly decoded data. Such new string is combined with the string of data obtained by the first scanning, to obtained the current string.

The combination of the two strings takes place by means of an algorithm comprising the following steps:

a) if a decoded character and an unknown character are found in the same position, the value of the decoded character is stored in the current string, b) if two decoded characters, equal but having a different associated error coefficient, are found in the considered position, the value of the character having a lower associated error value is stored in the string, c) if two different decoded characters are found in the considered position, the value of the character having the lower associated error value is stored in the string, or the character that is located before an unknown character in its own decoded string may be stored, or also an unknown character may be stored, d) if two unknown characters are found in the considered position, an unknown character is stored in the current string.

The two strings obtained from the code scanning in one direction and the opposite direction may also be utilised in the stitching algorithm as two different strings.

Figure 4:
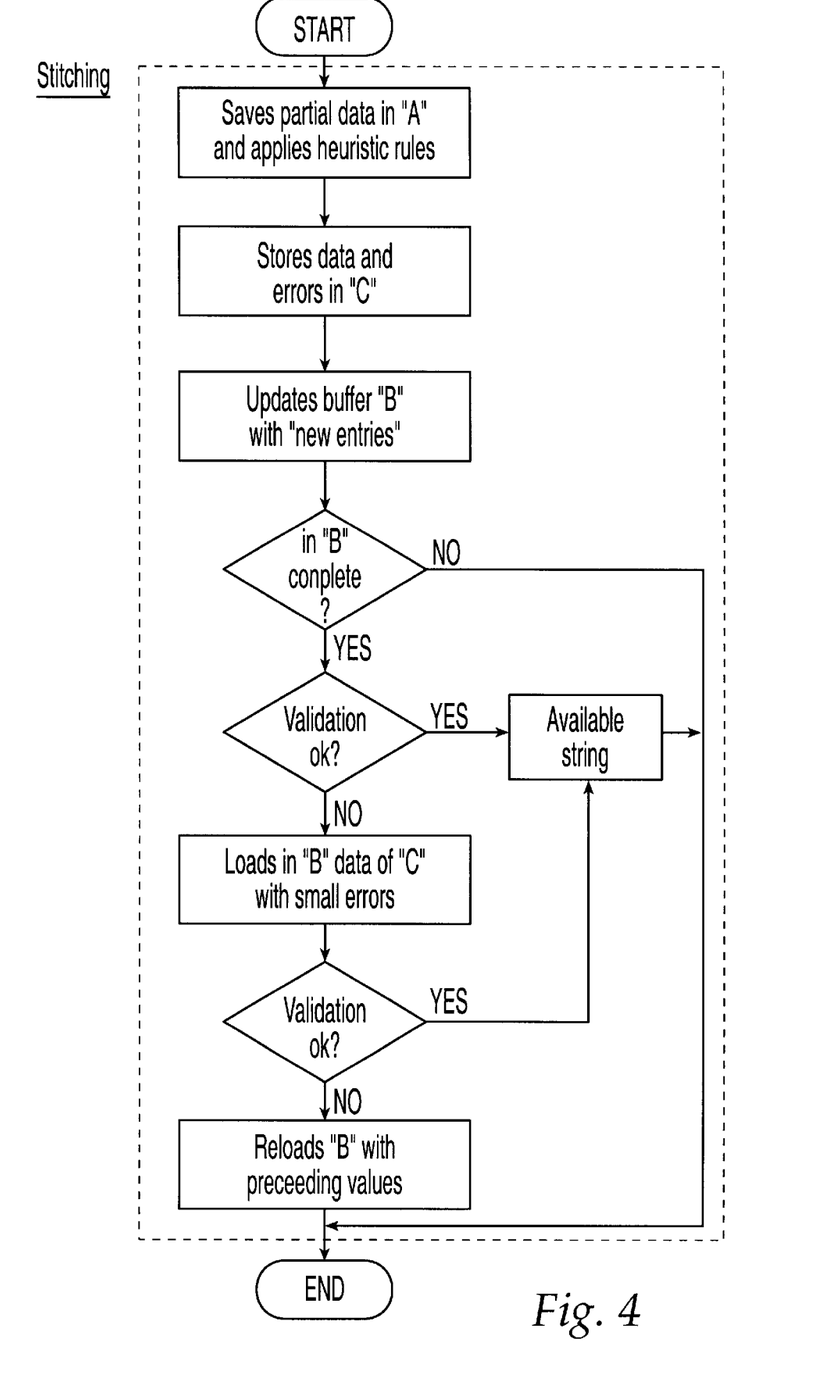
FIG. 4 shows a block diagram of a portion of the process of FIG. 3.

There will be now described in detail such stitching algorithm, represented in particular in FIG. 4.

Let us assume to have a first string of partly or entirely decoded characters, which we have called a current string, and an error coefficient associated to each decoded character. The data of such current string may come from one only reading of a code scanning or the combination of data obtained from two readings in two opposite directions of the same scanning.

The current string is stored in buffer A and is subject to a set of heuristic check rules, in order to reject beforehand poorly reliable characters.

The following are some of the possible rules:

If the string has a number of undecoded characters equal to or greater than ⅔ its total length, said string is in full rejected. The stitching algorithm is therefore stopped and the following scanning is analysed.

If no basic character has been classified for carrying on the decoding process (such as for instance the synchronism characters or other characters that are essential for the identification of the family which the code belongs to), the whole string is rejected and the following scanning is analysed.

If a character has been identified that adjoins on one only side a undecoded zone, a maximum error coefficient is associated to the same, whatever the error value belonging to it may be.

If a classified character is alone, between undecoded zones, there is a high probability that it has been mistakenly classified in that position, and therefore it is replaced by an unknown character.

In this way buffer A contains a current string comprising a set of "reliable" partial data (or characters).

Such partial data are stored in a buffer C intended for containing, position by position, the characters acquired from preceding scannings and the error coefficients associated to the same. When a character that had previously appeared in the same position has to be stored in C, the updating of the error coefficients is performed by calculating an arithmetical mean between the error coefficient associated to the just classified character and the error coefficient associated to the same character in the same position, updated as at the preceding scanning.

By initialising the updated error coefficients with the maximum value, an error value is obtained that keeps track, not only of the reliability of the classified characters, but also of the frequency with which the character has been decoded in the same position. The greater the frequency, the more reliable the character.

However, buffer C should be tapped only for a possible second validation try.

Once a current string of reliable data has been processed in buffer A, a buffer B that stores the consolidated data is updated, following the criterion of inserting in B, in each position, the decoded character of A, while the positions of B where, in correspondence of A, an unknown character is found are not updated. In this way, B is filled, scanning after scanning, with reliable data, privileging those that have appeared more recently in each position.

This criterion is justified by two observations:

if the validation try of data of B has already been made with a negative result, it is useful to replace in B the data with the latest novelties before trying again the validation, in case of non decoding of a label, if the code reading device is of a manual type, the user is led to shift instinctively the reader along the width of the code in the less altered zones of the label.

When B contains a complete string of characters that are all decoded, one goes on trying the validation. If this gives a positive result, the decoding process has succeeded. In this case, all buffers A, B, C are re-initialised.

In the contrary case, having loaded in B a third string of decoded characters taken from C, one goes on with a second validation try: for each position, the datum is chosen that has been decoded in preceding scannings and to which the lowest updated error coefficient is associated. It is worth stressing that, as the characters decoded and stored in C have been previously filtered by the above described heuristic rules—and have therefore a high reliability—C is unlikely to have, for each position, more than two different characters.

According to an advantageous embodiment of the invention, it suffices that two decoded characters for each position are stored in C.

If also the second validation try should fail, one reloads in B the data it contained on the first try, proceeding with the process by introducing a new current string and applying again the stitching algorithm.

Therefore, such process allows a reliable decoding of particularly deteriorated labels with a limited number of scannings and without requiring high calculation resources. If the scanning lines comprise several codes (identified each by a synchronism character of start and stop), the stitching process is carried out in the same way, utilising in particular several groups of buffers A, B and C, each such group being reserved for each individual code.

What is claimed is:

1. A process for scanning a bar code, said code comprising two synchronism characters, one of the synchronism characters being a character of start and the other one a character of stop, and a plurality of useful characters in-between the character of start and the character of stop, each character comprising a plurality of a bar-and-space elements, the process comprising the steps of:

a) acquisition of a first bar code scanning along a scanning line,
   b) identification of a belonging family of the bar code,
   c) determination of a width of at least one of the synchronism characters,
   d) calculation of an estimated width of each character of the code being examined, based on the width of the at least one of the synchronism characters considered,
   e) identification, by way of a first approximation, of a character following one of the synchronism characters by counting a number of m elements equal to a number of elements that make up each character in the belonging family,
   f) determination of a potential width of said following character,
   g) checking whether the potential width of said following character differs from the estimated width of a lower quantity with respect to a prefixed tolerance, and:
      g1) if said check gives a positive result, identification of said following character as a "decodable character", and reiteration, for each character following the decodable character, of steps e) through g), until the other synchronism character has been reached,
      g2) if said check gives a negative result, labeling of said following character as an "undecodable character".

2. A process for scanning a bar code, said code comprising two synchronism characters, one of the synchronism characters being a character of start and the other one a character of stop, and a plurality of useful characters in-between the character of start and the character of stop, each character comprising a plurality of a bar-and-space elements, the process comprising the steps of:

a) acquisition of a first bar code scanning alone a scanning line,
   b) identification of a belonging family of the bar code,
   c) determination of a width of at least one of the synchronism characters,
   d) calculation of an estimated width of each character of the code being examined, based on the width of the at least one of the synchronism characters considered,
   e) identification, by way of a first approximation, of a character following one of the synchronism characters by counting a number of m elements equal to a number of elements that make up each character in the belonging family,
   f) determination of a potential width of said following character,
   g) checking whether the potential width of said following character differs from the estimated width of a lower quantity with respect to a prefixed tolerance, and:
      g1) if said check gives a positive result, identification of said following character as a "decodable character", and reiteration, for each character following the decodable character, of steps e) through g), until the other synchronism character has been reached,
      g2) if said check gives a negative result, labeling of said following character as an "undecodable character",
      wherein if the check of step g) gives a positive result, the decoding of the decodable character is tried before reiterating steps e) through g) for the following characters, and
      if said decoding gives a positive result:
         storing of the decoded character in a decoding string intended for containing a first set of hypothetical values of the code characters,
         updating of the estimated width of the character of the code being examined depending on the decoded character,
      if said decoding gives a negative result:
         identification of said character as an "undecodable character", and reiteration of steps e) through g) for each following character.

3. The process according to claim 2, wherein the updating of the estimated width of the code character takes place by assuming, as a new estimated width, the width of the decoded character.

4. The process according to claim 2, wherein the updating of the estimated width of the code character takes place by assuming as a new estimated width, the arithmetical mean between the width of the decoded character and the estimated width.

5. The process according to claim 2, wherein, if the decoding the decodable character gives a positive result, an error coefficient associated to the decoded character is calculated.

6. The process according to claim 5, wherein the error coefficient is calculated according to the following formula:

$$err_k = \min\left(\frac{2*d}{m}, 1\right)$$

with d=max|$e_i-e_i^*$|, wherein i varies throughout the whole of elements of the character, and wherein:

m is the module estimate performed throughout the scanning, wherein the module is the width of the smallest element of the scanning, $e_i$ is the value of the width of the $i^{th}$ element of the character, $e_i^*$ is the value of the width of the ideal $i^{th}$ corresponding element in the classified character, d is the greatest of the distances of each element from its own ideal value.

7. A process for scanning a bar code, said code comprising two synchronism characters, one of the synchronism characters being a character of start and the other one a character of stop, and a plurality of useful characters in-between the character of start and the character of stop, each character comprising a plurality of a bar-and-space elements, the process comprising the steps of:

a) acquisition of a first bar code scanning along a scanning line, b) identification of a belonging family of the bar code, c) determination of a width of at least one of the synchronism characters, d) calculation of an estimated width of each character of the code being examined, based on the width of the at least one of the synchronism characters considered, e) identification, by way of a first approximation, of a character following one of the synchronism characters by counting a number of m elements equal to a number of elements that make up each character in the belonging family f) determination of a potential width of said following character, g) checking whether the potential width of said following character differs from the estimated width of a lower quantity with respect to a prefixed tolerance, and:

g1) if said check gives a positive result, identification of said following character as a "decodable character", and reiteration, for each character following the decodable character, of steps e) through g), until the other synchronism character has been reached, g2) if said check gives a negative result, labeling of said following character as an "undecodable character", wherein, if the check of step g) gives a negative result, the following steps are carried out:

h) identification, by way of second approximation, of the character following one of the synchronism characters, by counting a number of elements equal to m±2, i) determination of a new potential width of such following character as identified by way of second approximation, l) check if said new potential width differs from the estimated width of a lower quantity with respect to the prefixed tolerance, and:

l1) if such check gives a positive result, identification of such following character as identified by way of second approximation as being an "undecodable character", and reiteration, for each character following the identified character, of steps e) through g) until the other synchronism character has been reached, l2) if such check gives a negative result, reiteration, for a p number of times, of the operations h) through l), adding to or removing each time two further elements from the previously counted number of elements.

8. The process according to claim 7, wherein if the $p^{th}$ check 12) of the new width gives a negative result, the following steps are carried out:

m) counting of a number of elements equal to twice the number of m elements that make up each character in the belonging family identified, n) determination of the width of said 2 m counted elements, o) checking whether such width differs from twice the estimated width of a lower quantity with respect to the prefixed tolerance, and:

o1) if such check gives a positive result, labelling of the code zone corresponding to the 2 m elements counted as "2 undecodable characters" and reiteration of steps e) through g) for each character following the 2 undecodable characters, until the other synchronism character is reached.

9. The process according to claim 8, wherein if such check gives a negative result, the following steps are carried out:

o2) reiteration of steps m) through o), counting a number of elements equal to 3 m, and:

o2i) if the check between the 3 m elements and the triple of the estimated width gives a positive result, labelling of the coding zone corresponding to the 3 m elements counted as "3 undecodable characters", and reiteration of steps e) through g) for each character following the 3 undecodable characters, until the other synchronism character is reached.

10. The process according to claim 9, wherein if the check between the 3 m elements and the triple of the estimated width gives a negative result, the following step is carried out:

o2ii) labelling of the code zone following the last character that has been identified or labelled as an "undecodable zone" of the bar code and acquisition of the code scanning according to the same scanning line gone through in the opposite direction, reiterating steps e) through o2), so as to obtain a new string comprising a further first set of hypothetical values of the code characters.

11. The process according to claim 10, wherein the values of the first set of hypothetical values of the code characters are compared with the values having the same position of the further first set of hypothetical values of the code characters, to process a current string, according to the following steps:

14a) if, in a considered position, a decoded character and an undecodable character are found, storing in the current string of the value of the decoded character, 14b) if, in the considered position, two equal decoded characters are found having a different coefficient of associate error, storing in the current string of the value of the character having the lowest coefficient of associated error, 14c) if, in the considered position, two different decoded characters are found, storing in the current string of the value of the character having the lowest coefficient of associated error, 14d) if, in the considered position, two undecodable characters are found, storing in the current string an unknown character.

12. The process according to claim 11, wherein if an unknown character is stored in the current string, the following steps are carried out:

15a) acquisition of a new bar code scanning, according to a new scanning line, 15b) obtaining a new set of hypothetical values of the code characters according to the steps e) through o2), 15c) comparison of such new set of hypothetical values with the previously processed current string, in order to update such string according to steps 14a) through 14d), 15d) reiteration of steps 15a) through 15c) until all the characters of the current string have been decoded, in order to obtain a complete decoding string, 15e) performing of a validation try of the decoded characters of the complete decoding string.

13. The process according to claim 11, wherein the current string or the values of the first hypothetical set of the code characters are stored in a buffer A and subjected to a set of heuristic check rules in order to reject in advance the poorly reliable characters.

14. The process according to claim 13, wherein the heuristic rules comprise the following steps:

checking whether the string has a number of undecoded characters equal to or greater than ⅔ of its total length, and, if so, rejecting in full such string and starting the analysis of the following scanning, checking whether any character has been not classified that is basic for carrying on the decoding process and, if so, rejecting the whole string and starting the analysis of the following scanning, checking whether a character has been identified that adjoins on one only side an undecoded zone, and if so, associating to such character a maximum error coefficient, checking whether a classified character is alone, between undecoded zones, and, if so, replacing such character with an unknown character.

15. The process according to claim 8, wherein if the check of step o) gives a negative result, the following step is carried out:

o1i) labelling of the code zone following the last character that has been identified or labelled as an "undecodable zone" of the bar code and acquisition of the code scanning according to the same scanning line gone through in the opposite direction, reiterating steps e) through o) so as to obtain a new string comprising a further first set of hypothetical values of the code characters.

16. The process according to claim 7, wherein if the $p^{th}$ check 12) of the new width gives a negative result, the following step is carried out:

l2i) labelling of the code zone following the last character that has been identified or labelled as an "undecodable zone" of the bar code and acquisition of the code scanning according to the same scanning line gone through in the opposite direction, reiterating steps e) through 12), so as to obtain a new string comprising a further first set of hypothetical values of the code characters.

17. The process according to claim 7, wherein p is equal to 2.

18. A process for the combination of a partly or entirely decoded first string with at least a second string, in order to process a complete decoding string, comprising the following steps:

scanning a bar code, said code comprising two synchronism characters, one of the synchronism characters being a character of start and the other one a character of stop, and a plurality of useful characters in-between the character of start and the character of stop, each character comprising a plurality of a bar-and-space elements, the scanning comprising the steps of:

a) acquisition of a first bar code scanning along a scanning line, b) identification of a belonging family of the bar code, c) determination of a width of at least one of the synchronism characters, d) calculation of an estimated width of each character of the code being examined, based on the width of the at least one of the synchronism characters considered, e) identification, by way of a first approximation, of a character following one of the synchronism characters by counting a number of m elements equal to a number of elements that make up each character in the belonging family, f) determination of a potential width of said following character, g) checking whether the potential width of said following character differs from the estimated width of a lower quantity with respect to a prefixed tolerance, and:

g1) if said check gives a positive result, identification of said following character as a "decodable character", and reiteration, for each character following the decodable character, of steps e) through g), until the other synchronism character has been reached, g2) if said check gives a negative result, labeling of said following character as an "undecodable character", 18a) providing of a partly or entirely decoded first data string, comprising a plurality of decoded characters and an error coefficient associated to each decoded character, 18b) storing of said first string in a buffer A, 18c) updating with said first string of a buffer B, intended for containing consolidated data, 18d) storing of a second string in buffer A, 18e) updating of buffer with said second string, 18f) if buffer B contains a complete string of entirely decoded characters, performing of a validation try of said complete string, 18g) if the validation try gives a positive result, causing the decoded string to become available, 18h) if the validation try gives a negative result, acquisition of a third string and reiteration of steps 18d) through 18f).

19. The process according to claim 18, wherein the updating of buffer B takes place by inserting in B, in each position, the corresponding decoded character of A.

20. The process according to claim 18, wherein the step of storing the decoded characters of the string and the related error coefficient in a buffer C is associated to steps 18c) and 18e).

21. The process according to claim 20, comprising further the step of updating in buffer C the error coefficients of the decoded characters of the string that are equal to the characters previously stored in C in the same position.

22. The process according to claim 21, wherein the updating in C of the error coefficients of the characters takes place by calculating an arithmetic mean between the error coefficient associated to the character of the $n^{th}$ string and the error coefficient consolidated by the preceding strings and associated to the equal character stored in the same position.

23. The process according to claim 20, wherein, if the validation try of the complete string has a negative result, the following steps are carried out:

loading in buffer B a third string taken from buffer C and comprising, for each position, the decoded characters having the lowest updated error coefficient,     performing a new validation try for such third string.

24. The process according to claim 23, wherein, if the new validation try has a negative result, the following steps are carried out:

reloading in buffer B the complete string of which a first validation has been tried     reiteration of steps 18d) through 18f).

25. The process according to claim 18, comprising further the step of submitting the first string to a set of heuristic rules to reject poorly reliable characters.

\* \* \* \* \*